(12) United States Patent
Guo (10) Patent No.: US 11,064,052 B2
(45) Date of Patent: Jul. 13, 2021

(54) PAGE INSERTION METHOD AND DEVICE

(71) Applicant: HUAWEI TECHNOLOGIES CO., LTD., Shenzhen (CN)

(72) Inventor: Jiancheng Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 15/392,513

(22) Filed: Dec. 28, 2016

(65) Prior Publication Data

US 2017/0111480 A1   Apr. 20, 2017

Related U.S. Application Data

(63) Continuation of application No. PCT/CN2014/081278, filed on Jun. 30, 2014.

(51) Int. Cl.
| | |
|---|---|
| *H04L 29/06* | (2006.01) |
| *H04L 29/08* | (2006.01) |
| *G06F 16/957* | (2019.01) |

(52) U.S. Cl.
CPC ............ *H04L 67/42* (2013.01); *G06F 16/957* (2019.01); *H04L 67/02* (2013.01); *H04L 67/04* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 9,361,446 | B1 * | 6/2016 | Demirjian | ............... G06F 21/36 |
| 2008/0306815 | A1 | 12/2008 | Dykes et al. | |
| 2008/0307454 | A1 * | 12/2008 | Ahanger | ............... G06Q 30/02 |
| | | | | 725/36 |
| 2011/0082946 | A1 | 4/2011 | Gopalakrishnan | |

(Continued)

FOREIGN PATENT DOCUMENTS

| | | |
|---|---|---|
| CN | 101278531 | 10/2008 |
| CN | 101320369 | 12/2008 |

(Continued)

OTHER PUBLICATIONS

Russian Decision to Grant Patent dated Jun. 27, 2018, in corresponding Russian Patent Application No. 2016150921/08, 18 pgs.

(Continued)

*Primary Examiner* — Brian Whipple
(74) *Attorney, Agent, or Firm* — Slater Matsil, LLP (57) ABSTRACT

The present invention includes a page insertion method and device. The method includes: acquiring a page insertion policy; receiving a webpage acquisition request message sent MS; determining first address information corresponding to the webpage acquisition request message; determining second address information of a to-be-inserted page according to the page insertion policy; and adding the first address information and the second address information to a response message and sending the response message to the MS. Thus the MS acquires the to-be-inserted page when acquiring the webpage, reduces a time for service interaction, ensures integrity of the webpage acquired by the MS, thereby effectively improving system performance.

21 Claims, 4 Drawing Sheets

(56) References Cited

U.S. PATENT DOCUMENTS

| | | | |
|---|---|---|---|
| 2012/0151375 A1 | 6/2012 | Lin et al. | |
| 2012/0259694 A1 | 10/2012 | Zhang | |
| 2012/0290436 A1* | 11/2012 | Frost | G06Q 30/06 705/26.41 |
| 2012/0331376 A1* | 12/2012 | Gorokhovsky | G06F 9/451 715/234 |
| 2013/0073401 A1* | 3/2013 | Cook | G06F 12/0802 705/14.73 |
| 2014/0006924 A1* | 1/2014 | Tsolis | G06Q 30/0277 715/234 |
| 2014/0058835 A1 | 2/2014 | Yudashkin | |
| 2015/0149293 A1 | 5/2015 | Xiong et al. | |

FOREIGN PATENT DOCUMENTS

| | | |
|---|---|---|
| CN | 101539934 A | 9/2009 |
| CN | 102591625 | 7/2012 |
| CN | 103309877 A | 9/2013 |
| CN | 103377192 A | 10/2013 |
| CN | 103718529 | 4/2014 |
| RU | 2452001 C1 | 5/2012 |
| WO | 2011/075900 A1 | 6/2011 |
| WO | 2014/019134 A1 | 2/2014 |

OTHER PUBLICATIONS

Russian Office Action dated Feb. 2, 2018, in corresponding Russian Patent Application No. 2016150921, 15 pgs.
Chinese Office Action dated Mar. 2, 2018, in corresponding Chinese Patent Application No. 201480002454.0, 8 pgs.
International Search Report dated Mar. 27, 2015 in corresponding International Application No. PCT/CN2014/081278.
International Search Report dated Mar. 27, 2015, in corresponding International Patent Application No. PCT/CN2014/081278.
Extended European Search Report dated Mar. 27, 2017 in corresponding European Patent Application No. 14896737.5.

* cited by examiner

PAGE INSERTION METHOD AND DEVICE

CROSS-REFERENCE TO RELATED APPLICATIONS

This application is a continuation of International Application No. PCT/CN2014/081278, filed on Jun. 30, 2014, the disclosure of which is hereby incorporated by reference in its entirety.

TECHNICAL FIELD

Embodiments of the present invention relate to the field of computer technologies, and in particular, to a page insertion method and device.

BACKGROUND

With the development of computer technologies, by means of a page insertion technology, specific content used for an advertisement push service, a customized service query, or the like, can be forcibly inserted into a page browsed by a user.

The page insertion technology refers to inserting specified content into a Hyper Text Transport Protocol (HTTP) browsing page of user equipment by using a gateway device.

A common page insertion technology includes a toolbar solution, and an operation procedure of the toolbar solution includes the following steps:

Step 1: A Policy Control and Charge Rule Function (PCRF) delivers a toolbar policy when determining that a preset time arrives.

The preset time refers to a time for delivering the toolbar policy.

Step 2: When determining to access a webpage by using a browser, a mobile station (MS) sends an HTTP Get request message to a network side device.

Step 3: The network side device receives the HTTP Get request message, and returns a response packet of the HTTP Get request message to a gateway GPRS support node (GGSN).

Step 4: The GGSN receives the response packet of the HTTP Get request message, parses the response packet of the HTTP Get request message, sequences and rearranges the received response packet of the HTTP Get request message to find the first response packet segment, included in the response packet, of a Transmission Control Protocol (TCP) Seq link, inserts Java script code into a header of the packet segmentation, and adds the packet segment to a response packet of a toolbar page and sends the response packet to the MS.

In this way, when the MS receives the response packet, a screen displays content of a page that is requested, in the HTTP Get request message, to be accessed, and simultaneously displays content in the toolbar page, thereby implementing page content insertion.

However, during an implementation process of an existing page insertion technology, there is a problem that a response time of service interaction is long and incomplete display of page content that a user requests to access is easily caused.

SUMMARY

In view of this, embodiments of the present invention provide a page insertion method and device, to resolve an existing problem that a response time of service interaction is long and incomplete display of page content that a user requests to access is easily caused.

According to a first aspect of the present invention, a page insertion method is provided, including:
acquiring a page insertion policy;
receiving a webpage acquisition request message sent by a mobile station MS;
determining, according to the webpage acquisition request message, first address information corresponding to the webpage acquisition request message;
determining second address information of a to-be-inserted page according to the page insertion policy; and
adding the first address information and the second address information to a response message and sending the response message to the MS.

With reference to a possible implementation manner of the first aspect of the present invention, in a first possible implementation manner, the method further includes:
determining, according to the page insertion policy, a time for performing page insertion operation; and
when the determined time for performing page insertion operation arrives, for the currently received webpage acquisition request message sent by the MS, sending a service link disconnect message corresponding to the webpage acquisition request message to a website server, where the service link disconnect message is used for notifying the webpage server that a service link corresponding to the received webpage acquisition request message is blocked by a gateway device.

With reference to the possible implementation manner of the first aspect of the present invention or the first possible implementation manner of the first aspect of the present invention, in a second possible implementation manner, the acquiring a page insertion policy includes:
receiving the page insertion policy sent by a policy control and charging rules function PCRF; or,
acquiring the page insertion policy from a page insertion policy preconfigured on its own.

With reference to the possible implementation manner of the first aspect of the present invention, the first possible implementation manner of the first aspect of the present invention, or the second possible implementation manner of the first aspect of the present invention, in a third possible implementation manner, the webpage acquisition request message is carried in a Hyper Text Transport Protocol HTTP GET message.

According to a second aspect of the present invention, a page insertion method is provided, including:
sending a webpage acquisition request message to a gateway device;
receiving a response message, of the webpage acquisition request message, returned by the gateway device, where the response message includes first address information corresponding to the webpage acquisition request message, and second address information of a to-be-inserted page; and
acquiring, according to the first address information, a first page corresponding to the webpage acquisition request message, and acquiring, according to the second address information, a second page that needs to be inserted for display by the gateway device.

With reference to a possible implementation manner of the second aspect of the present invention, in a first possible implementation manner, the method further includes:
displaying page content corresponding to the acquired first page and page content corresponding to the acquired second page.

With reference to the possible implementation manner of the second aspect of the present invention or the first possible implementation manner of the second aspect of the present invention, in a second possible implementation manner, the acquiring, according to the first address information, a first page corresponding to the webpage acquisition request message, and acquiring, according to the second address information, a second page that needs to be inserted for display by the gateway device includes:

acquiring the first page from a webpage server according to the first address information; and acquiring the second page from a page server according to the second address information.

According to a third aspect of the present invention, a page insertion device is provided, including:

an acquiring module, configured to acquire a page insertion policy;

a receiving module, configured to receive a webpage acquisition request message sent by a mobile station MS;

an address information determining module, configured to: determine, according to the webpage acquisition request message, first address information corresponding to the webpage acquisition request message, and determine second address information of a to-be-inserted page according to the page insertion policy; and a sending module, configured to add the first address information and the second address information to a response message and send the response message to the MS.

With reference to a possible implementation manner of the third aspect of the present invention, in a first possible implementation manner, the device further includes:

a time determining module, configured to determine, according to the page insertion policy, a time for performing page insertion operation; and a notifying module, configured to: when the determined time for performing page insertion operation arrives, for the currently received webpage acquisition request message sent by the MS, send a service link disconnect message corresponding to the webpage acquisition request message to a website server, where the service link disconnect message is used for notifying the webpage server that a service link corresponding to the received webpage acquisition request message is blocked by a gateway device.

With reference to the possible implementation manner of the third aspect of the present invention or the first possible implementation manner of the third aspect of the present invention, in a second possible implementation manner, the acquiring module is specifically configured to receive the page insertion policy sent by a policy control and charging rules function PCRF; or, acquire the page insertion policy from a page insertion policy preconfigured by the acquiring module.

With reference to the possible implementation manner of the third aspect of the present invention, the first possible implementation manner of the third aspect of the present invention, or the second possible implementation manner of the third aspect of the present invention, in a third possible implementation manner, the webpage acquisition request message is carried in a Hyper Text Transport Protocol HTTP GET message.

According to a fourth aspect of the present invention, a page insertion device is provided, including:

a sending module, configured to send a webpage acquisition request message to a gateway device;

a receiving module, configured to receive a response message, of the webpage acquisition request message, returned by the gateway device, where the response message includes first address information corresponding to the webpage acquisition request message, and second address information of a to-be-inserted page; and a page acquiring module, configured to: acquire, according to the first address information, a first page corresponding to the webpage acquisition request message, and acquire, according to the second address information, a second page that needs to be inserted for display by the gateway device.

With reference to a possible implementation manner of the fourth aspect of the present invention, in a first possible implementation manner, the device further includes:

a displaying module, configured to display page content corresponding to the acquired first page and page content corresponding to the acquired second page.

With reference to the possible implementation manner of the fourth aspect of the present invention or the first possible implementation manner of the fourth aspect of the present invention, in a second possible implementation manner, the page acquiring module is specifically configured to: acquire the first page from a webpage server according to the first address information, and acquire the second page from a page server according to the second address information.

According to a fifth aspect of the present invention, a page insertion device is provided, including:

a signal receiver, configured to acquire a page insertion policy, and receive a webpage acquisition request message sent by a mobile station MS;

a processor, configured to: determine, according to the webpage acquisition request message, first address information corresponding to the webpage acquisition request message, and determine second address information of a to-be-inserted page according to the page insertion policy; and a signal transmitter, configured to add the first address information and the second address information to a response message and send the response message to the MS.

With reference to a possible implementation manner of the fifth aspect of the present invention, in a first possible implementation manner, the processor is further configured to determine, according to the page insertion policy, a time for performing page insertion operation; and the signal transmitter is further configured to: when the determined time for performing page insertion operation arrives, for the currently received webpage acquisition request message sent by the MS, send a service link disconnect message corresponding to the webpage acquisition request message to a website server, where the service link disconnect message is used for notifying the webpage server that a service link corresponding to the received webpage acquisition request message is blocked by a gateway device.

With reference to the possible implementation manner of the fifth aspect of the present invention or the first possible implementation manner of the fifth aspect of the present invention, in a second possible implementation manner, the signal receiver is specifically configured to receive the page insertion policy sent by a policy control and charging rules function PCRF; or, acquire the page insertion policy from a page insertion policy preconfigured by the signal receiver.

With reference to the possible implementation manner of the fifth aspect of the present invention, the first possible implementation manner of the fifth aspect of the present invention, or the second possible implementation manner of the fifth aspect of the present invention, in a third possible implementation manner, the webpage acquisition request message is carried in a Hyper Text Transport Protocol HTTP GET message.

According to a sixth aspect of the present invention, a page insertion device is provided, including:

a signal transmitter, configured to send a webpage acquisition request message to a gateway device;

a signal receiver, configured to receive a response message, of the webpage acquisition request message, returned by the gateway device, where the response message includes first address information corresponding to the webpage acquisition request message, and second address information of a to-be-inserted page; and a processor, configured to: acquire, according to the first address information, a first page corresponding to the webpage acquisition request message, and acquire, according to the second address information, a second page that needs to be inserted for display by the gateway device.

With reference to a possible implementation manner of the sixth aspect of the present invention, in a first possible implementation manner, the device further includes:

a display, configured to display page content corresponding to the acquired first page and page content corresponding to the acquired second page.

With reference to the possible implementation manner of the sixth aspect of the present invention or the first possible implementation manner of the sixth aspect of the present invention, in a second possible implementation manner, the processor is specifically configured to: acquire the first page from a webpage server according to the first address information, and acquire the second page from a page server according to the second address information.

In the embodiments of the present invention, a page insertion policy is acquired; a webpage acquisition request message sent by a mobile station MS is received; first address information corresponding to the webpage acquisition request message is determined according to the webpage acquisition request message; second address information of a to-be-inserted page is determined according to the page insertion policy; and the first address information and the second address information are added to a response message and the response message is sent to the MS. In this way, when receiving the webpage acquisition request message sent by the MS, a gateway device can determine the to-be-inserted page according to the page insertion policy, block a service link for transporting the webpage acquisition request message to a network side device, and return, to the MS, both the address information of the to-be-inserted page and the address information of a webpage that the MS requests to acquire, so that the MS acquires the to-be-inserted page when acquiring the webpage, which not only reduces a time for service interaction, but also ensures integrity of the webpage acquired by the MS, thereby effectively improving system performance.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To achieve the objective of the present invention, embodiments of the present invention provide a page insertion method and device. A page insertion policy is acquired; a webpage acquisition request message sent by a mobile station MS is received; first address information corresponding to the webpage acquisition request message is determined according to the webpage acquisition request message; second address information of a to-be-inserted page is determined according to the page insertion policy; and the first address information and the second address information are added to a response message and the response message is sent to the MS. In this way, when receiving the webpage acquisition request message sent by the MS, a gateway device can determine the to-be-inserted page according to the page insertion policy, block a service link for transporting the webpage acquisition request message to a network side device, and return, to the MS, both the address information of the to-be-inserted page and the address information of a webpage that the MS requests to acquire, so that the MS acquires the to-be-inserted page when acquiring the webpage, which not only reduces a time for service interaction, but also ensures integrity of the webpage acquired by the MS, thereby effectively improving system performance.

The embodiments of the present invention are described in detail in the following with reference to the accompanying drawings of the specification. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
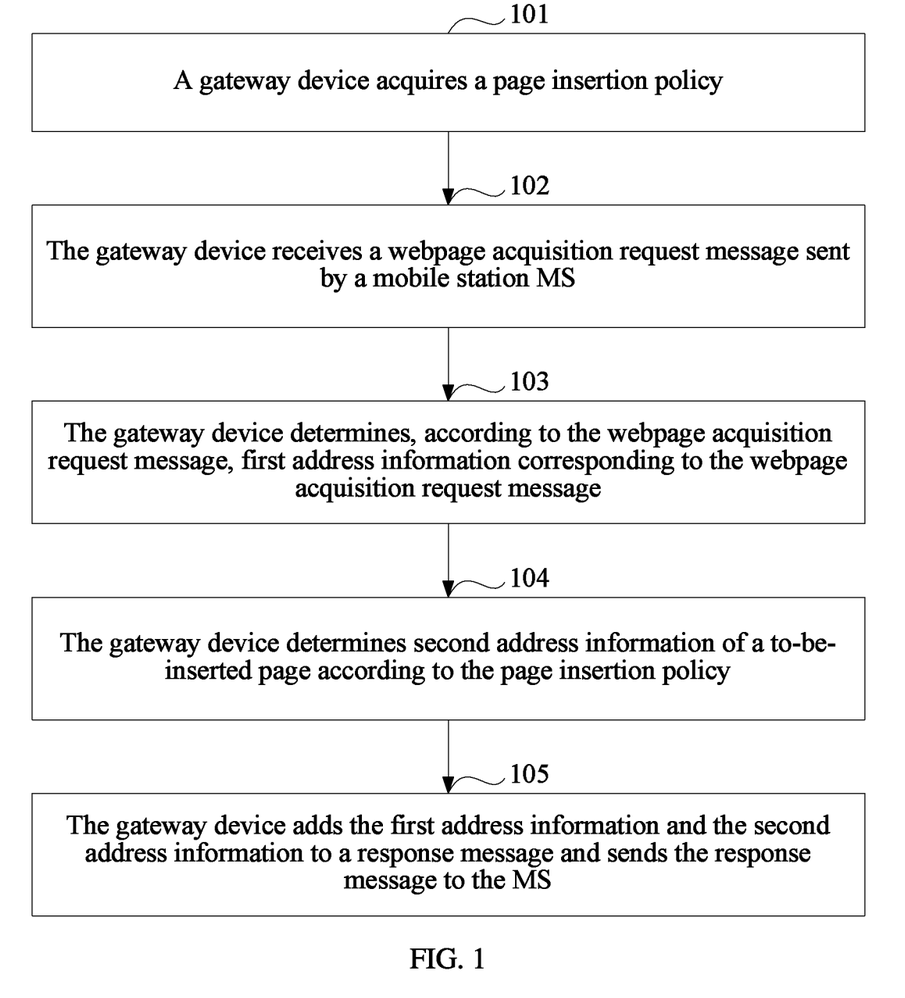
FIG. 1 is a schematic flowchart of a page insertion method according to Embodiment 1 of the present invention.

As shown in FIG. 1, FIG. 1 is a schematic flowchart of a page insertion method according to Embodiment 1 of the present invention. The method may be described as follows:

Step 101: A gateway device acquires a page insertion policy.

The page insertion policy is used for representing that another page content needs to be inserted into a webpage that needs to be accessed by an MS.

In step 101, a manner of acquiring the page insertion policy by the gateway device includes but is not limited to:

Manner 1:

The gateway device receives the page insertion policy sent by a PCRF.

Specifically, as a policy delivery network element, the PCRF determines when another page content needs to be inserted into a page to be accessed by the MS, that is, the PCRF determines a policy delivery time, and delivers the page insertion policy to the gateway device when the policy delivery time arrives, so that when the gateway device receives the page insertion policy, the gateway device can insert in time a specified page into the page to be accessed by the MS.

It should be noted that, in this embodiment of the present invention, the page insertion policy may be sent to the gateway device by the PCRF, or may be sent to the gateway device by another network element device, which is not limited herein.

Manner 2:

The gateway device locally reads the page insertion policy.

Specifically, the gateway device locally preconfigures a page insertion policy, and reads the page insertion policy when a page insertion time arrives.

The page insertion policy may be referred to as a tool bar policy, or may be a policy in another form, which is not limited herein.

Optionally, the page insertion policy includes a time for performing page insertion operation and address information (which is also referred to as second address information) of a to-be-inserted page.

Optionally, when acquiring the page insertion policy, the gateway device determines, according to the page insertion policy, the time for performing page insertion operation.

Step 102: The gateway device receives a webpage acquisition request message sent by a mobile station MS.

In step 102, when the MS needs to request webpage information from an Internet side, the MS sends the webpage acquisition request message to the gateway device.

The webpage acquisition request message may be carried in an HTTP GET message; or may be in a message form that conforms to another network protocol, which is not limited herein.

When receiving the webpage acquisition request message sent by the MS, the gateway device determines, according to the acquired page insertion policy, whether page insertion operation needs to be performed for the webpage acquisition request message; if the page insertion operation needs to be performed, the gateway device performs subsequent operations; if the page insertion operation does not need to be performed, the gateway device forwards the webpage acquisition request message to a network side device, so that the network side device responds to the webpage acquisition request message in time.

Specifically, a manner of determining, by the gateway device according to the page insertion policy when receiving the webpage acquisition request message sent by the MS, whether page insertion operation needs to be performed for the webpage acquisition request message includes but is not limited to that:

when receiving the webpage acquisition request message sent by the MS, the gateway device determines a time for receiving the webpage acquisition request message, and determines whether the time for receiving the webpage acquisition request message conforms to the time, determined according to the acquired page insertion policy, for performing page insertion operation; if the time for receiving the webpage acquisition request message conforms to the time for performing page insertion operation, the gateway device determines that page insertion operation needs to be performed for the webpage acquisition request message; otherwise, the gateway device determines that page insertion operation does not need to be performed for the webpage acquisition request message.

Optionally, when it is determined that page insertion operation needs to be performed for the webpage acquisition request message, a service link disconnect message corresponding to the webpage acquisition request message is sent to a website server.

The service link disconnect message is used for notifying the webpage server that a service link corresponding to the received webpage acquisition request message is blocked by the gateway device.

That is, when the determined time for performing page insertion operation arrives, for the currently received webpage acquisition request message sent by the MS, the service link disconnect message corresponding to the webpage acquisition request message is sent to the website server.

Step 103: The gateway device determines, according to the webpage acquisition request message, first address information corresponding to the webpage acquisition request message.

In step 103, when the gateway device determines in step 102 that page insertion operation needs to be performed for the webpage acquisition request message, the gateway device blocks an operation of forwarding the webpage acquisition request to the network side device, and determines, according to the webpage acquisition request message, the first address information corresponding to the webpage acquisition request message.

Step 104: The gateway device determines second address information of a to-be-inserted page according to the page insertion policy.

In step 104, when acquiring the page insertion policy, the gateway device parses the page insertion policy to obtain address information of the to-be-inserted page, that is, the second address information.

It should be noted that, the address information of the to-be-inserted page and time information of page insertion may be carried in the page insertion policy according to actual needs, where the address information of the to-be-inserted page may be uniform resource locator (URL) information, or may be WWW (World Wide Web) address information, which is not limited herein.

It still should be noted that, step 103 and step 104 may be performed simultaneously, or may be performed one after another; step 103 may be performed first or step 104 may be performed first, and an execution sequence is not limited herein.

Step 105: The gateway device adds the first address information and the second address information to a response message and sends the response message to the MS.

In step 105, because the gateway device determines in step 101 that page insertion operation needs to be performed for the webpage acquisition request message, the gateway device blocks an operation of forwarding the webpage acquisition request to the network side device, and creates a response message for the webpage acquisition request, adds the first address information, and the second address information of the to-be-inserted page to the response message and sends the response message to the MS, so that MS can acquire, according to the first address information, a first page corresponding to the webpage acquisition request message, and acquire, according to the second address information, a second page that needs to be inserted for display by the gateway device.

In another embodiment of the present invention, the method further includes:

when it is determined that page insertion operation needs to be performed for the webpage acquisition request message, and when the determined time for performing page insertion operation arrives, sending, by the gateway device, a service link disconnect message corresponding to the webpage acquisition request message to a page server.

The service link disconnect message is used for notifying the page server that a service link corresponding to the webpage acquisition request message is blocked.

In this way, during a process of performing page insertion operation, the gateway device does not need to maintain a link between the MS and the network side device; in a stage of requesting to acquire a webpage by a user, the gateway device determines whether to insert a page, and simultaneously notifies the MS of address information of a webpage that the user requests to access and address information of a page that needs to be inserted, so that the MS acquires the to-be-inserted page when acquiring the webpage, which ensures integrity of page content that the user requests to access, and avoids a case in the prior art that an original access page is incomplete due to the addition of a script to the original access page.

It should be noted that, in this embodiment of the present invention, the webpage acquisition request message may be a page acquisition request message, but the page described herein is not the same as a to-be-inserted page in the page insertion policy. The to-be-inserted page in the page insertion policy may be an advertisement page, a news page, an announcement page, or the like; may have only text or may have both text and a picture, or may only be a picture, or may be a combination of content in various forms such as a picture, text, sound, and a video, which is not limited herein.

The gateway device described in this embodiment of the present invention may be a GGSN device, or may be another network element device having a gateway function, which is not limited herein.

In the solution of Embodiment 1 of the present invention, a page insertion policy is acquired; a webpage acquisition request message sent by a mobile station MS is received; first address information corresponding to the webpage acquisition request message is determined according to the webpage acquisition request message; second address information of a to-be-inserted page is determined according to the page insertion policy; and the first address information and the second address information are added to a response message and the response message is sent to the MS. In this way, when receiving the webpage acquisition request message sent by the MS, a gateway device can determine the to-be-inserted page according to the page insertion policy, block a service link for transporting the webpage acquisition request message to a network side device, and return, to the MS, both the address information of the to-be-inserted page and the address information of a webpage that the MS requests to acquire, so that the MS acquires the to-be-inserted page when acquiring the webpage, which not only reduces a time for service interaction, but also ensures integrity of the webpage acquired by the MS, thereby effectively improving system performance.

Embodiment 2

Figure 2:
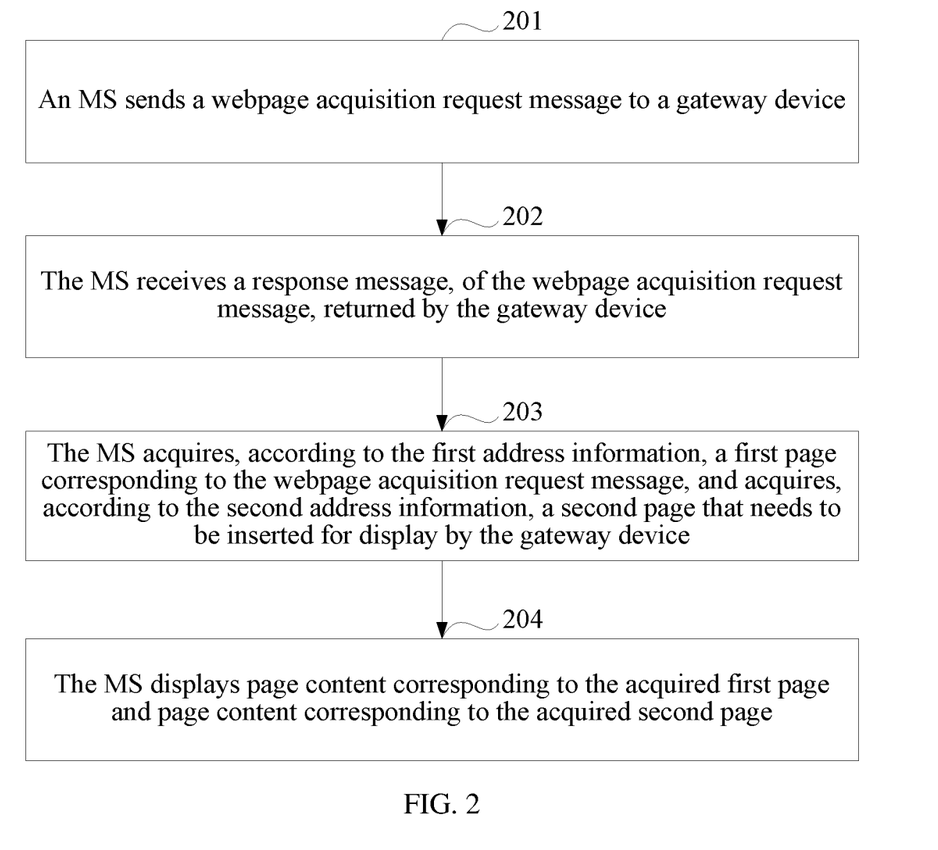
FIG. 2 is a schematic flowchart of a page insertion method according to Embodiment 2 of the present invention.

As shown in FIG. 2, FIG. 2 is a schematic flowchart of a page insertion method according to Embodiment 2 of the present invention. The method may be described as follows:

Step 201: An MS sends a webpage acquisition request message to a gateway device.

Step 202: The MS receives a response message, of the webpage acquisition request message, returned by the gateway device.

The response message includes first address information corresponding to the webpage acquisition request message, and second address information of a to-be-inserted page.

Step 203: The MS acquires, according to first address information, a first page corresponding to the webpage acquisition request message, and acquires, according to second address information, a second page that needs to be inserted for display by the gateway device.

In step 203, the MS acquires the first page from a network device according to the first address information, and acquires the second page from a page server according to the second address information.

It should be noted that, "first" and "second" in the "first address information" and "second address information" are only used for distinguishing different address information of two pages, and do not have other meanings.

It should be noted that, the first page and the second page in this embodiment of the present invention may be different pages stored in a same device, or may be different pages stored in different devices.

Step 204: The MS displays page content corresponding to the acquired first page and page content corresponding to the acquired second page.

Embodiment 3

Figure 3:
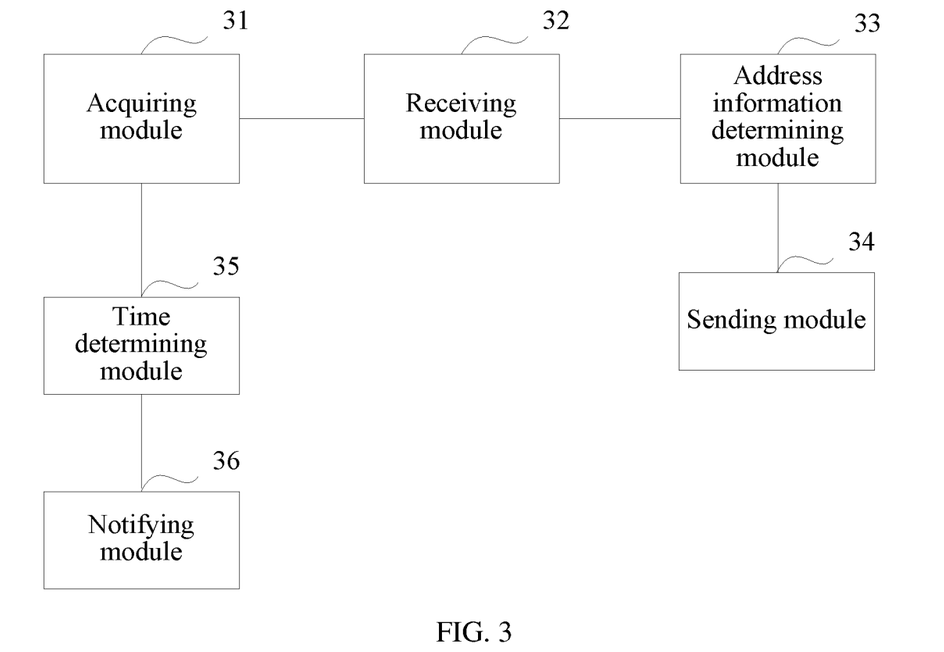
FIG. 3 is a schematic structural diagram of a page insertion device according to Embodiment 3 of the present invention.

As shown in FIG. 3, FIG. 3 is a schematic structural diagram of a page insertion device according to Embodiment 3 of the present invention. The device may be integrated into a gateway device, or may be a gateway device or a third-party device having a function of a gateway device, which is not limited herein. The device includes: an acquiring module 31, a receiving module 32, an address information determining module 33, and a sending module 34.

The acquiring module 31 is configured to acquire a page insertion policy.

The receiving module 32 is configured to receive a webpage acquisition request message sent by a mobile station MS.

The address information determining module 33 is configured to: determine, according to the webpage acquisition request message, first address information corresponding to the webpage acquisition request message, and determine second address information of a to-be-inserted page according to the page insertion policy.

The sending module 34 is configured to add the first address information and the second address information to a response message and send the response message to the MS.

In another embodiment of the present invention, the device further includes: a time determining module 35 and a notifying module 36.

The time determining module 35 is configured to determine, according to the page insertion policy, a time for performing page insertion operation.

The notifying module 36 is configured to: when the determined time for performing page insertion operation arrives, for the currently received webpage acquisition request message sent by the MS, send a service link disconnect message corresponding to the webpage acquisition request message to a website server, where the service link disconnect message is used for notifying the webpage server that a service link corresponding to the received webpage acquisition request message is blocked by a gateway device.

In another embodiment of the present invention, the acquiring module 31 is specifically configured to receive the page insertion policy sent by a policy control and charging rules function PCRF; or, acquire the page insertion policy from a page insertion policy preconfigured by the acquiring module 31.

In another embodiment of the present invention, the webpage acquisition request message is carried in a Hyper Text Transport Protocol HTTP GET message.

It should be noted that, the device described in this embodiment of the present invention may be implemented in a hardware manner, or may be implemented in a software manner, which is not limited herein.

Embodiment 4

Figure 4:
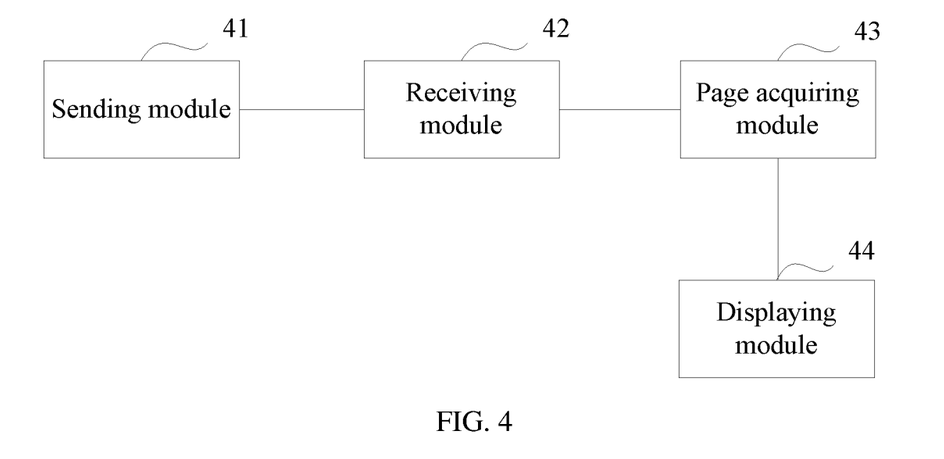
FIG. 4 is a schematic structural diagram of a page insertion device according to Embodiment 4 of the present invention.

As shown in FIG. 4, FIG. 4 is a schematic structural diagram of a page insertion device according to Embodiment 4 of the present invention. The device includes: a sending module 41, a receiving module 42, and a page acquiring module 43.

The sending module 41 is configured to send a webpage acquisition request message to a gateway device.

The receiving module 42 is configured to receive a response message, of the webpage acquisition request message, returned by the gateway device, where the response message includes first address information corresponding to the webpage acquisition request message, and second address information of a to-be-inserted page.

The page acquiring module 43 is configured to: acquire, according to the first address information, a first page corresponding to the webpage acquisition request message, and acquire, according to the second address information, a second page that needs to be inserted for display by the gateway device.

In another embodiment of the present invention, the device further includes a displaying module 44.

The displaying module 44 is configured to display page content corresponding to the acquired first page and page content corresponding to the acquired second page.

In another embodiment of the present invention, the page acquiring module 43 is specifically configured to: acquire the first page from a webpage server according to the first address information, and acquire the second page from a page server according to the second address information.

It should be noted that, the device described in this embodiment of the present invention may be implemented in a hardware manner, or may be implemented in a software manner; the device described in this embodiment of the present invention may be a mobile station, or may be a functional module integrated into a mobile station, which is not limited herein.

Embodiment 5

Figure 5:
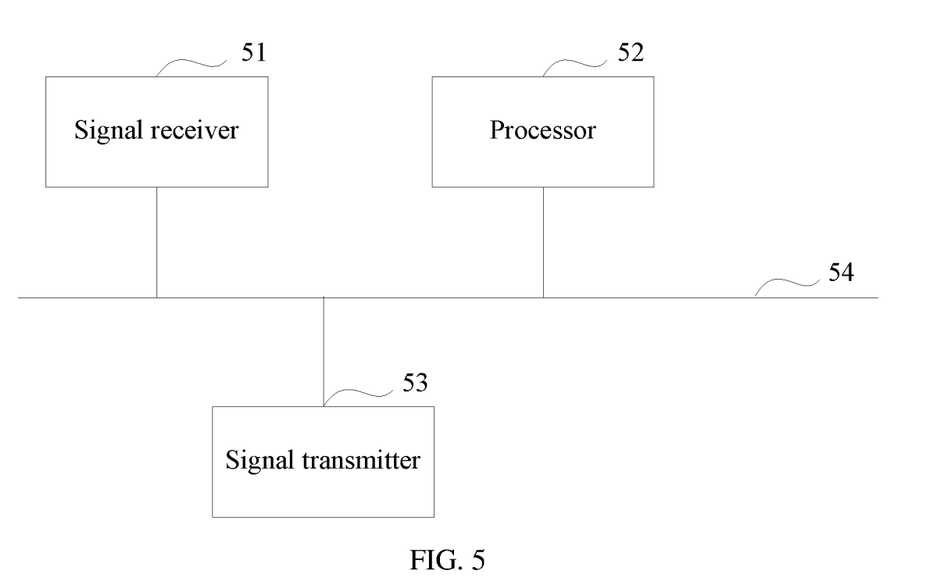
FIG. 5 is a schematic structural diagram of a page insertion device according to Embodiment 5 of the present invention.

As shown in FIG. 5, FIG. 5 is a schematic structural diagram of a page insertion device according to Embodiment 5 of the present invention. The page insertion device has functions of executing Embodiment 1 of the present invention to Embodiment 4 of the present invention. The page insertion device may use a structure of a general computer system, and a computer system may specifically be a computer based on a processor. An entity of the page insertion device includes: a signal receiver 51, a processor 52, and a signal transmitter 53. The signal receiver 51, the processor 52, and the signal transmitter 53 are connected by using a bus 54.

The signal receiver 51 is configured to acquire a page insertion policy, and receive a webpage acquisition request message sent by a mobile station MS.

The processor 52 is configured to: determine, according to the webpage acquisition request message, first address information corresponding to the webpage acquisition request message, and determine second address information of a to-be-inserted page according to the page insertion policy.

The signal transmitter 53 is configured to add the first address information and the second address information to a response message and send the response message to the MS.

In another embodiment of the present invention, the processor 52 is further configured to determine, according to the page insertion policy, a time for performing page insertion operation.

The signal transmitter 51 is further configured to: when the determined time for performing page insertion operation arrives, for the currently received webpage acquisition request message sent by the MS, send a service link disconnect message corresponding to the webpage acquisition request message to a website server, where the service link disconnect message is used for notifying the webpage server that a service link corresponding to the received webpage acquisition request message is blocked by a gateway device.

In another embodiment of the present invention, the signal receiver 53 is specifically configured to receive the page insertion policy sent by a policy control and charging rules function PCRF; or, acquire the page insertion policy from a page insertion policy preconfigured by the signal receiver 53.

In another embodiment of the present invention, the webpage acquisition request message is carried in a Hyper Text Transport Protocol HTTP GET message.

The processor 52 may be one processor, or may be a general name of multiple processing elements. For example, the processor may be a central processing unit (Central Processing Unit, CPU), may be an application specific integrated circuit (Application Specific Integrated Circuit, ASIC), or may be one or more integrated circuits configured to implement this embodiment of the present invention, for example, one or more microprocessors (digital signal processor, DSP), or one or more field programmable gate arrays (Field Programmable Gate Array, FPGA).

It can be seen that, when receiving a webpage acquisition request message sent by an MS, the page insertion device can determine a to-be-inserted page according to a page insertion policy, block a service link for transporting the webpage acquisition request message to a network side device, and return, to the MS, both address information of the to-be-inserted page and address information of a webpage that the MS requests to acquire, so that the MS acquires the to-be-inserted page when acquiring the webpage, which not only reduces a time for service interaction, but also ensures integrity of the webpage acquired by the MS, thereby effectively improving system performance.

Embodiment 6

Figure 6:
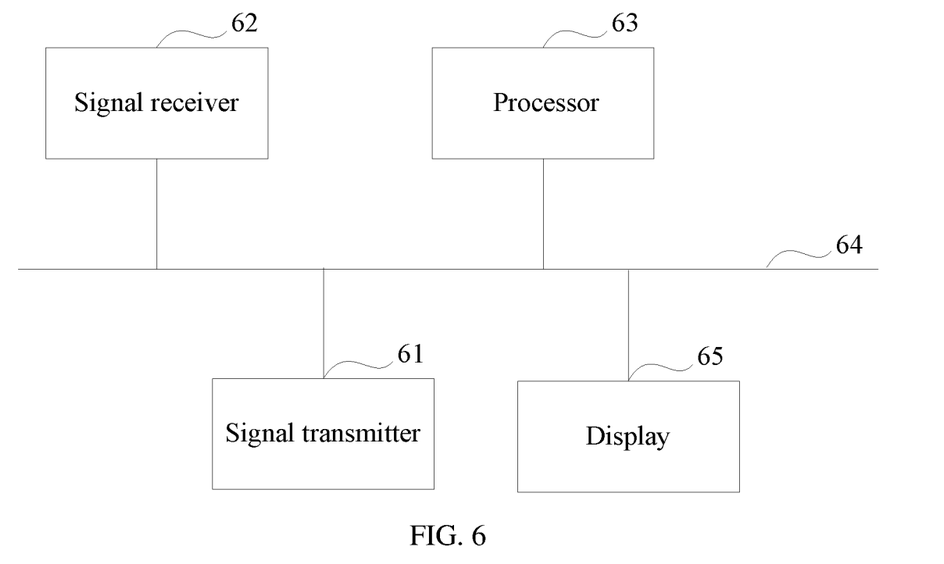
FIG. 6 is a schematic structural diagram of a page insertion device according to Embodiment 6 of the present invention.

As shown in FIG. 6, FIG. 6 is a schematic structural diagram of a page insertion device according to Embodiment 6 of the present invention. The page insertion device has functions of executing Embodiment 1 of the present invention to Embodiment 4 of the present invention. The page insertion device may use a structure of a general computer system, and a computer system may specifically be a computer based on a processor. An entity of the page insertion device includes: a signal transmitter 61, a signal receiver 62, and a processor 63. The signal transmitter 61, the signal receiver 62, and the processor 63 are connected by using a bus 64.

The signal transmitter 61 is configured to send a webpage acquisition request message to a gateway device.

The signal receiver 62 is configured to receive a response message, of the webpage acquisition request message, returned by the gateway device, where the response message includes first address information corresponding to the webpage acquisition request message, and second address information of a to-be-inserted page.

The processor 63 is configured to: acquire, according to the first address information, a first page corresponding to the webpage acquisition request message, and acquire, according to the second address information, a second page that needs to be inserted for display by the gateway device.

In another embodiment of the present invention, the device further includes a display 65.

The display 65 is configured to display page content corresponding to the acquired first page and page content corresponding to the acquired second page.

In another embodiment of the present invention, the processor 63 is specifically configured to: acquire the first page from a webpage server according to the first address information, and acquire the second page from a page server according to the second address information.

The processor 63 may be one processor, or may be a general name of multiple processing elements. For example, the processor may be a central processing unit (Central Processing Unit, CPU), may be an application specific integrated circuit (Application Specific Integrated Circuit, ASIC), or may be one or more integrated circuits configured to implement this embodiment of the present invention, for example, one or more microprocessors (digital signal processor, DSP), or one or more field programmable gate arrays (Field Programmable Gate Array, FPGA).

A person skilled in the art should understand that the embodiments of the present invention may be provided as a method, an apparatus (device), or a computer program product. Therefore, the present invention may use a form of hardware only embodiments, software only embodiments, or a form of embodiments with a combination of software and hardware. In addition, the present invention may use a form of a computer program product that is implemented on one or more computer-usable storage media (including but not limited to a magnetic disk memory, a CD-ROM, and an optical memory) that include computer-usable program code.

The present invention is described with reference to the flowcharts and/or block diagrams of the method, the apparatus (device), and the computer program product according to the embodiments of the present invention. It should be understood that computer program instructions may be used to implement each process in the flowcharts and/or each block in the block diagrams and a combination of a process in the flowcharts and a block in the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer readable memory that can instruct a computer or another programmable data processing device to work in a specific manner, so that the instructions stored in the computer readable memory generate manufactures that include an instruction apparatus. The instruction apparatus implements a specific function in one or more processes in the flowcharts and/or in one or more blocks in the block diagrams.

These computer program instructions may also be loaded onto a computer or another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, a person skilled in the art can make changes and modifications to these embodiments once they learn the basic inventive concept. Therefore, the following claims are intended to be construed as coverage of the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope defined by the following claims in the present invention and their equivalent technologies.

What is claimed is:

1. A page insertion method, comprising:
    acquiring, by a gateway device, a page insertion policy;
    receiving, by the gateway device from a mobile station (MS), a webpage acquisition request message requesting a first page;
    determining, by the gateway device, according to the webpage acquisition request message, first address information corresponding to the webpage acquisition request message;
    determining, by the gateway device, second address information of a to-be-inserted page according to the page insertion policy;
    blocking, by the gateway device, a service link for transporting the webpage acquisition request message to a network side device, wherein the blocking comprises sending, by the gateway device, a service link disconnect message to a page server notifying the page server that a service link corresponding to the webpage acquisition request message is blocked, wherein a link between the MS and the network side device is released;
    adding, by the gateway device, the first address information and the second address information to a response message; and
    sending, by the gateway device, the response message to the MS, the response message excluding the requested first page and the to-be-inserted page.

2. The method according to claim 1, wherein the method further comprises:

determining, according to the page insertion policy, a time for performing a page insertion operation; and in response to the determined time for performing the page insertion operation arriving, for the received webpage acquisition request message sent by the MS, sending a service link disconnect message corresponding to the received webpage acquisition request message to a website server, the service link disconnect message being used for notifying the website server that a service link corresponding to the received webpage acquisition request message is blocked by the gateway device.

3. The method according to claim 1, wherein the acquiring the page insertion policy comprises:

receiving the page insertion policy sent by a policy control and charging rules function (PCRF); or, acquiring the page insertion policy from a preconfigured page insertion policy.

4. The method according to claim 1, wherein the webpage acquisition request message is carried in a Hyper Text Transport Protocol (HTTP) GET message.

5. A page insertion method, comprising:

sending, by a mobile station to a gateway device, a webpage acquisition request message requesting a first page;

receiving, by the mobile station, a response message, of the webpage acquisition request message, returned by the gateway device in response to blocking a service link for transporting the webpage acquisition request message to a network side device, wherein a link between the mobile station and the network side device is released in response to the gateway device blocking the service link, the response message comprising first address information corresponding to the webpage acquisition request message, and second address information of a to-be-inserted page, and the response message excluding the requested first page and the to-be-inserted page; and acquiring, by the mobile station, according to the first address information, the first page corresponding to the webpage acquisition request message, and acquiring, according to the second address information, a second page that needs to be inserted for display by the gateway device.

6. The method according to claim 5, wherein the method further comprises:

displaying first page content corresponding to the acquired first page and second page content corresponding to the acquired second page.

7. The method according to claim 5, wherein the acquiring, according to the first address information, the first page corresponding to the webpage acquisition request message, and acquiring, according to the second address information, the second page that needs to be inserted for display by the gateway device comprises:

acquiring the first page from a webpage server according to the first address information; and acquiring the second page from a page server according to the second address information.

8. A gateway device, comprising:

a computer system configured to:

acquire a page insertion policy;

receive, by the gateway device from a mobile station (MS), a webpage acquisition request message requesting a first page;

determine, according to the webpage acquisition request message, first address information corresponding to the webpage acquisition request message, and determine second address information of a to-be-inserted page according to the page insertion policy; and block a service link for transporting the webpage acquisition request message to a network side device, wherein the blocking comprises sending, by the gateway device, a service link disconnect message to a page server notifying the page server that a service link corresponding to the webpage acquisition request message is blocked, wherein a link between the MS and the network side device is released;

add the first address information and the second address information to a response message; and send the response message to the MS, wherein the response message excludes the requested first page and the to-be-inserted page.

9. The gateway device according to claim 8, wherein the computer system is further configured to:

determine, according to the page insertion policy, a time for performing a page insertion operation; and in response to the determined time for performing the page insertion operation arriving, for the received webpage acquisition request message sent by the MS, send a service link disconnect message corresponding to the received webpage acquisition request message to a website server, wherein the service link disconnect message is used for notifying the website server that a service link corresponding to the received webpage acquisition request message is blocked by the gateway device.

10. The gateway device according to claim 8, wherein the computer system is further configured to receive the page insertion policy sent by a policy control and charging rules function (PCRF); or, acquire the page insertion policy from a preconfigured page insertion policy.

11. The gateway device according to claim 8, wherein the webpage acquisition request message is carried in a Hyper Text Transport Protocol (HTTP) GET message.

12. A mobile station, comprising:

a computer system configured to:

send, from the mobile station to a gateway device, a webpage acquisition request message requesting a first page;

receive a response message, of the webpage acquisition request message, returned by the gateway device in response to blocking a service link for transporting the webpage acquisition request message to a network side device, wherein a link between the mobile station and the network side device is released in response to the gateway device blocking the service link, wherein the response message comprises first address information corresponding to the webpage acquisition request message, and second address information of a to-be-inserted page, and wherein the response message excludes the requested first page and the to-be-inserted page; and acquire, according to the first address information, the first page corresponding to the webpage acquisition request message, and acquire, according to the second address information, a second page that needs to be inserted for display by the gateway device.

13. The mobile station according to claim 12, wherein the mobile station further comprises:

a display, configured to display page content corresponding to the acquired first page and page content corresponding to the acquired second page.

14. The mobile station according to claim 12, wherein the computer system is further configured to acquire the first page from a webpage server according to the first address information, and acquire the second page from a page server according to the second address information.

15. A gateway device, comprising:
a signal receiver, configured to:
  acquire a page insertion policy, and
  receive, by the gateway device from a mobile station (MS), a webpage acquisition request message requesting a first page;
a processor, configured to:
  determine, according to the webpage acquisition request message, first address information corresponding to the webpage acquisition request message;
  determine second address information of a to-be-inserted page according to the page insertion policy; and
  block a service link for transporting the webpage acquisition request message to a network side device, wherein the blocking comprises sending, by the gateway device, a service link disconnect message to a page server notifying the page server that a service link corresponding to the webpage acquisition request message is blocked, wherein a link between the MS and the network side device is released; and
a signal transmitter, configured to:
  add the first address information and the second address information to a response message, and
  send the response message to the MS, wherein the response message excludes the requested first page and the to-be-inserted page.

16. The gateway device according to claim 15, wherein the processor is further configured to determine, according to the page insertion policy, a time for performing a page insertion operation; and
the signal transmitter is further configured to: in response to the determined time for performing the page insertion operation arriving, for the received webpage acquisition request message sent by the MS, send a service link disconnect message corresponding to the received webpage acquisition request message to a website server, wherein the service link disconnect message is used for notifying the website server that a service link corresponding to the received webpage acquisition request message is blocked by the gateway device.

17. The gateway device according to claim 15, wherein the signal receiver is specifically configured to receive the page insertion policy sent by a policy control and charging rules function (PCRF); or,
acquire the page insertion policy from a preconfigured page insertion policy preconfigured by the signal receiver.

18. The gateway device according to claim 15, wherein the webpage acquisition request message is carried in a Hyper Text Transport Protocol (HTTP) GET message.

19. A mobile station, comprising:
a signal transmitter, configured to send, from the mobile station to a gateway device, a webpage acquisition request message requesting a first page;
a signal receiver, configured to receive a response message, of the webpage acquisition request message, returned by the gateway device in response to blocking a service link for transporting the webpage acquisition request message to a network side device, wherein a link between the mobile station and the network side device is released in response to the gateway device blocking the service link, wherein the response message comprises first address information corresponding to the webpage acquisition request message, and second address information of a to-be-inserted page, and wherein the response message excludes the requested first page and the to-be-inserted page; and
a processor, configured to:
  acquire, according to the first address information, the first page corresponding to the webpage acquisition request message, and
  acquire, according to the second address information, a second page that needs to be inserted for display by the gateway device.

20. The mobile station according to claim 19, wherein the mobile station further comprises:
a display, configured to display page content corresponding to the acquired first page and page content corresponding to the acquired second page.

21. The mobile station according to claim 19, wherein the processor is specifically configured to: acquire the first page from a webpage server according to the first address information, and acquire the second page from a page server according to the second address information.

* * * * *